United States Patent [19]
Dreyer et al.

[11] Patent Number: 5,504,544
[45] Date of Patent: Apr. 2, 1996

[54] PROJECTOR WITH MULTIPLE LAMP LIGHT SOURCE

[75] Inventors: John F. Dreyer, St. Paul, Minn.; Robert M. Fesler; Dennis F. Vanderwerf, both of Austin, Tex.

[73] Assignee: Minnesota Mining and Manufacturing Company, St. Paul, Minn.

[21] Appl. No.: 344,135

[22] Filed: Nov. 23, 1994

[51] Int. Cl.⁶ .................................................. G03B 21/28
[52] U.S. Cl. ..................... 353/38; 353/63; 353/DIG. 3; 362/241
[58] Field of Search .................... 353/37, 38, 94, 353/102, DIG. 3, 122, 63, 64; 362/241, 237, 236, 297, 346, 244, 339, 309, 337

[56] References Cited

U.S. PATENT DOCUMENTS

| | | | |
|---|---|---|---|
| 1,373,491 | 11/1921 | Detmler et al. | 353/63 |
| 1,887,650 | 11/1932 | Larner et al. | |
| 3,547,530 | 12/1970 | Poole | 353/70 |
| 3,752,575 | 8/1973 | Ataka | 353/DIG. 3 |
| 3,770,344 | 11/1973 | Fukushima | 353/38 |
| 3,979,160 | 9/1976 | Anderson et al. | 353/63 |
| 4,118,761 | 10/1978 | Dey | 353/64 |
| 4,952,053 | 8/1990 | Behr et al. | 353/65 |
| 4,979,813 | 12/1990 | Koga et al. | 353/67 |
| 4,984,144 | 1/1991 | Cobb, Jr. et al. | 362/339 |
| 4,989,948 | 2/1991 | Dreyer, Jr. | 350/97 |
| 5,231,433 | 7/1993 | Yoshida et al. | 353/63 |
| 5,296,882 | 3/1994 | Nelson et al. | 353/38 |

FOREIGN PATENT DOCUMENTS

| | | | |
|---|---|---|---|
| 0422661 | 4/1991 | European Pat. Off. | G02B 27/28 |
| 0509679 | 10/1992 | European Pat. Off. | B60Q 1/26 |
| 4214262 | 4/1993 | Germany | G03B 21/20 |
| 4-179046 | 4/1992 | Japan | H01K 7/02 |
| 4298730 | 10/1992 | Japan | 353/63 |
| 5-232399 | 5/1993 | Japan | G02B 27/00 |
| 5-224321 | 5/1993 | Japan | G03B 33/10 |
| 5-199485 | 5/1993 | Japan | H04N 5/74 |

*Primary Examiner*—William C. Dowling
*Attorney, Agent, or Firm*—Gary L. Griswold; Walter N. Kim; David W. Anderson

[57] ABSTRACT

A projection system is described which efficiently combines the output from multiple lamps, images of which are focused to a common point. The projected screen brightness is multiplied over that of a conventional single lamp of equivalent wattage. The screen brightness can be increased or diminished by switching individual lamps on or off, adjusting the light level for conventional overhead transparencies, or low transmission liquid crystal display projection panels.

9 Claims, 5 Drawing Sheets

PROJECTOR WITH MULTIPLE LAMP LIGHT SOURCE

FIELD OF THE INVENTION

The present invention relates to projection systems or projectors, particularly transmissive overhead projectors.

BACKGROUND OF THE INVENTION

With the increasing use of full-color, computer-generated and photographic transparencies, and liquid crystal display (LCD) projection panels, there is a need for projection systems of increased brightness. This has been recently addressed by the use of higher wattage tungsten-halogen lamps, metal-halide lamp technology, and high-efficiency anti-reflection coatings on the optical components. The use of higher wattage tungsten filament lamps increases the difficulty of cooling, and arc discharge lamps, such as metal halide, are relatively expensive.

In the past, several attempts to increase the illumination level of projection systems were characterized by the use of multiple lower wattage lamps. In the case of episcopic projection, commonly practiced in opaque projectors, it is simply necessary to illuminate the opaque copy with light from several sources. The scattered light from the copy which enters a projection lens is then directed to the screen. This type of projection system is described, for example, in U.S. Pat. No. 4,979,813.

In diascopic projection, light from a lamp is collected by single or multiple condensing lenses, passes through a projection transparency, and is focused to the projection lens. This mode of projection is commonly used in 35 millimeter and overhead projectors, and gives a brighter projected image than episcopic projection. See, for example, U.S. Pat. Nos. 3,547,530 and 3,979,160. However, since the condensing lens system can only efficiently focus light from one single point (lamp position) to another single point (projection lens position), diascopic projection is usually limited to the use of a single lamp. This inherently limits the brightness which may be achieved on the screen.

Several attempts have been made to efficiently combine the output of multiple lamps and bring them to a common focus. U.S. Pat. No. 1,887,650 describes a system combining eight lamps, U.S. Pat. No. 3,770,344 describes an overhead projector combining four lamps, and Japanese patent nos. 4-179046 and 5-199485 describe projectors combining two lamps. All of these devices suffer from a common deficiency in that the combined output from the lamps is not truly integrated. The combined lamp output beams are contiguous, yet spatially separated. The result is that should one lamp fail, the screen image brightness does not diminish uniformly, but rather individual sections of the screen image become completely dark, making part of the screen image unreadable.

True integration of the light from multiple sources, allowing them to be focused to a common point, is a more demanding task. U.S. Pat. No. 4,952,053 describes an overhead projector combining two lamps, U.S. Pat. No. 5,231,433 describes a method for integrating two collimated light beams by means of a linear grooved reflector or a linear grooved refracting element. Japanese patent no. 5-232399 describes a method for combining and integrating the output of two lamps by means of a beam splitter and multiple-pass reflections. The efficiency of these systems is limited by the achievable reflectance of the reflector coatings, geometric shading losses, and by the high chromatic dispersion of the refracting elements.

SUMMARY OF THE INVENTION

The current invention avoids the deficiencies of the prior art, providing a projection system with complete and efficient integration of the output of multiple light sources, to increase screen brightness. This is accomplished by a series of Fresnel collecting and focusing lenses, and a linear beam combining prismatic film that utilizes total internal reflection (TIR). The projection System can be in the form of an integrated projector designed to project electronically generated or stored information or in the form of an overhead projector adapted for full-size overhead transparencies, or the reduced format of LCD projection panels. The present invention further relates to a low profile overhead projector.

DETAILED DESCRIPTION OF THE INVENTION

Figure 1:
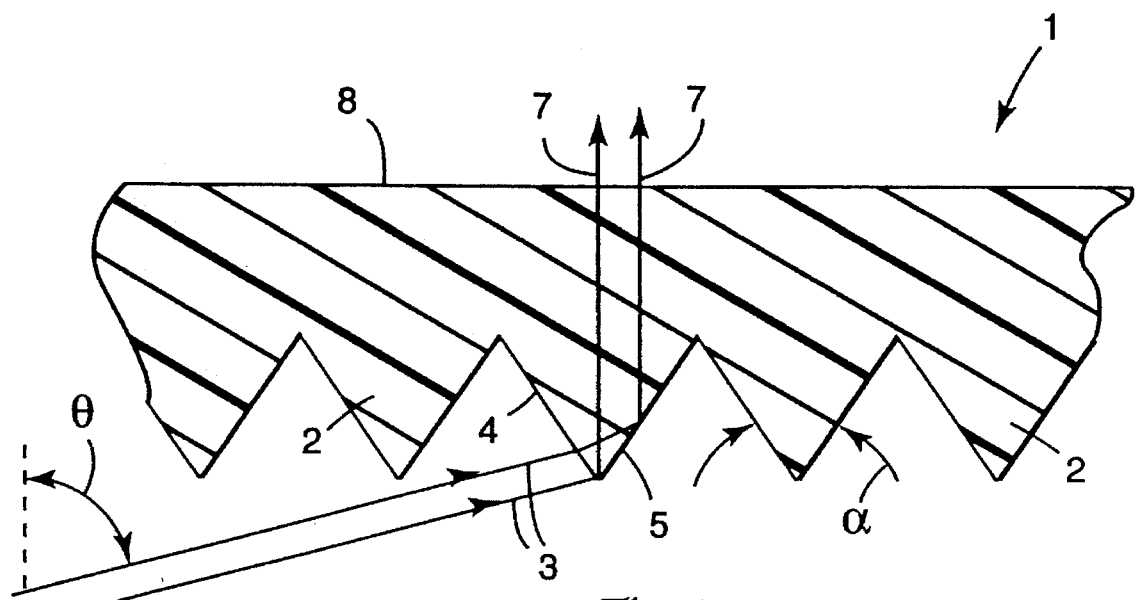
FIG. 1 is a cross-sectional view of a linear prismatic film of the prior art that deviates a beam of light by refraction and total internal reflection.

U.S. Pat. No. 4,984,144 describes a dispersive linear prismatic film 1 that deviates a beam of light by refraction and total internal reflection, as shown in FIG. 1. The isosceles triangle micro prisms 2 have an apex angle α of 69°. An incident ray 3 enters facet 4 at an entrance angle θ of about 75°, where it is refracted. It is then totally internally reflected at facet 5, and ray 7 exits perpendicular to the planar face 8. The large entrance angle θ of about 75°was a requirement for this prismatic lens in its intended use in a high aspect ratio light fixture.

Figure 2:
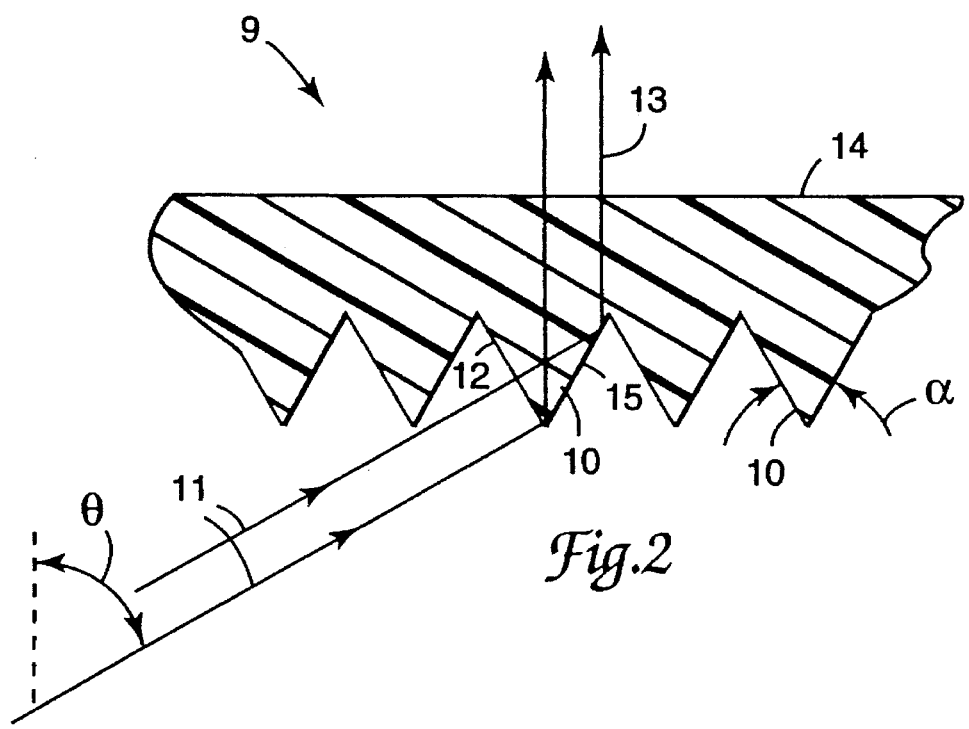
FIG. 2 is a cross-sectional view of a 60° apex angle linear prismatic film of the current invention.

FIG. 2 shows the linear prismatic film 9 of the current invention, consisting of a series of isosceles triangle shaped micro prisms 10 with an apex angle α of 60°. When an extended area collimated light beam 11 enters the film perpendicular to facet 12 at the specific entrance angle θ of 60°, then the light rays 13 exit perpendicular to plano surface 14 with the deviation occurring entirely by total internal refraction at facet 15. Since there is no refraction at surfaces 12 or 14, there is no dispersion and the ray deviation is independent of the refractive index of the material. Moreover, since ray 11 of the entrance beam touches both the peak and valley of adjacent microgrooves, the entrance beam 11 completely fills the TIR facet 15, and there are no geometric losses or spurious ray deviations.

Figure 3:
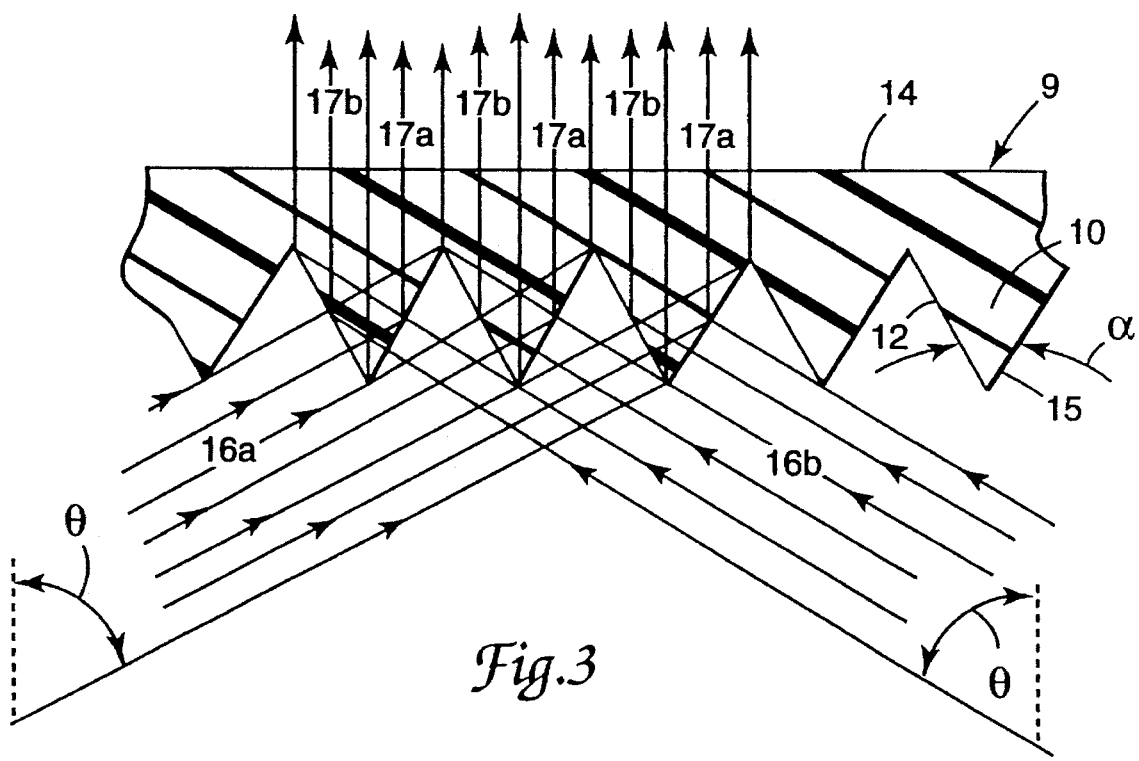
FIG. 3 is a cross-sectional view of the prismatic film of the present invention and illustrates schematically the integration of two collimated light beams.

For the 60° apex angle film, FIG. 3 illustrates that two collimated incident beams 16a and 16b can be efficiently and spatially combined. The individual exiting ray bundles 17a and 17b from the left and right incident beams 16a and 16b are interlaced on a micro scale, such that the intensity of light over the total area of the film 9 is effectively doubled.

For the linear prismatic beam-combining film 9 of the current invention, the following conditions need to be satisfied for most efficient operation:

1) The incident light 16a and 16b must be collimated so that light rays from each lamp enter the entire prismatic film 9 at the same entrance angle θ;

2) The preferred vertex angle α of the linear prismatic beam-combining film 9 is 60° plus or minus 2°; and 3) The preferred entrance angle θ of the collimated light entering the linear beam combining film is 60° plus or minus 3.5°.

If the prism vertex angle α is greater than 62°, less than 90% of each reflecting facet is utilized. For example, for an acrylic plastic prismatic film with a refractive index n=1.492, a vertex angle α of 62°, and an entrance angle θ of 63.5°, only about 90% of each reflecting facet is utilized. Excessive underfilling of the reflecting facets causes the collimated exit beams 17a and 17b produced by each adjacent microprism to be spatially separated, and dark banding begins to appear on the illuminated projection screen.

On the other hand, when the prism vertex angle α is less than 58°, less than 90% of the incident light rays 16a and 16b exit perpendicular to the film. For example, for an acrylic plastic prismatic film with a refractive index n=1.492, a vertex angle α of 58°, and an entrance angle θ of 56.5°, about 10% of the incident rays miss each reflecting facet. The light missing the reflecting facet exits the film in an uncollimated and uncontrolled direction, and does not contribute to the illumination on the projection screen.

Table 1 below illustrates the fraction of beam filling of each facet (BFF) for various vertex angles α of the film 9. Values of BFF less than unity represent underfilling of the reflecting facet, while values of BFF greater than unity represent overspilling of the reflecting facet. As explained above, more than 10% of the incident light is spatially separated or wasted at vertex angles θ above 62° or below 58°, upon exiting the film 9.

TABLE 1

| α | θ | BFF |
|---|---|---|
| 50 | 42.3 | 1.55 |
| 58 | 56.5 | 1.11 |
| 59 | 58.3 | 1.05 |
| 60 | 60.0 | 1.0 |
| 61 | 61.7 | 0.947 |
| 62 | 63.5 | 0.895 |
| 70 | 77.7 | 0.446 |

It will be seen from Table 1 that the entrance angle θ of the collimated light 16a and 16b generally changes in a similar fashion as the vertex angle α changes, but the relationship is not linear. This is because at entrance angles θ other than 60° the refractive index n of the material of the film has an effect. The exact relationship for the entrance angle θ necessary to produce maximum screen illumination at a given vertex angle α is given by the equation:

$$\theta = 90° - \left( \frac{\alpha}{2} + a\sin\left( n \cos\left( \frac{3}{2} \alpha \right) \right) \right)$$

wherein:

θ=said angle of inclination of said collimated light
α=said included angle of said prism sides
n=index of refraction of the material of said film.

Figure 4:
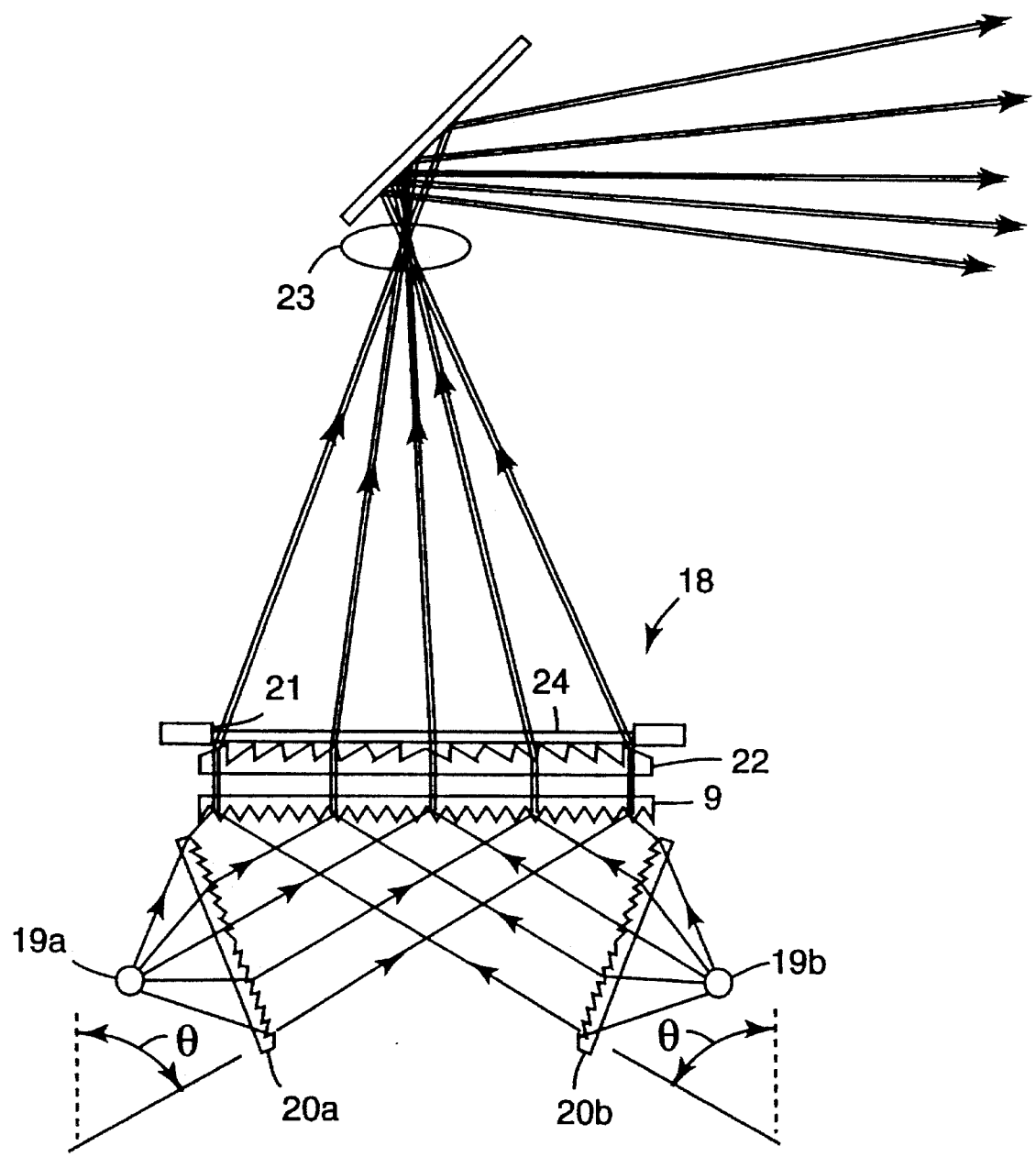
FIG. 4 is a schematic illustration of a transmissive overhead projector system that combines and integrates the output of two lamps.

FIG. 4 shows a projection system 18 that efficiently integrates the output from two lamps 19a and 19b, providing uniform screen brightness when each lamp 19a or 19b is individually on, and doubling the screen brightness when both lamps 19a and 19b are on. Light sources 19a and 19b are positioned at the focal point of rectangular-shaped Fresnel lenses 20a and 20b, respectively, which collimate the light beams. Each collimated beam fills the stage aperture 21 at an entrance angle θ of 60°. The stage aperture 21 can be square, to accommodate full-size overhead transparencies, or a reduced size rectangular format, to accommodate LCD projection panels. Near the stage aperture 21 is the 60° linear prismatic film 9. The integrated and collimated light exiting from the 60° linear prismatic film 9 enters a circular Fresnel lens 22 which focuses the light to the projection lens 23. A glass platen 24 is usually placed above the Fresnel lens 22 to supports the overhead transparency or LCD projection panel. If the projected facet widths of the linear prismatic film 9 are less than the resolving power of the eye at normal screen viewing distances, then each light source 19a and 19b appears to fully illuminate the entire screen. With both lamps 19a and 19b on, the screen brightness is effectively doubled over the brightness produced by a single lamp 19a or 19b.

Figure 5:
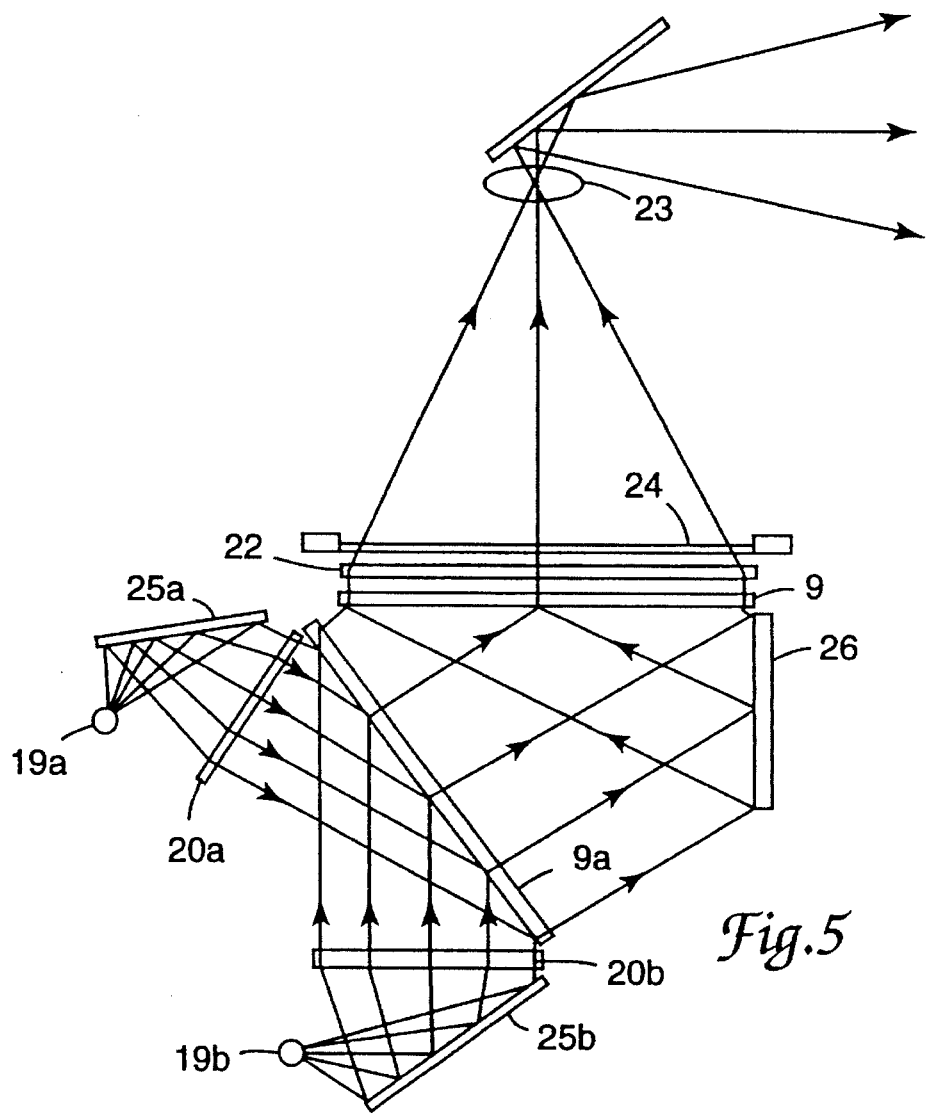
FIG. 5 is a schematic illustration of an alternate arrangement of a projection system that combines and integrates the output of two lamps.

FIG. 5 shows an alternate arrangement using folding mirrors 25a, 25b, and 26, to combine the output of the two light sources 19a and 19b. An additional 60° beam combining linear prism 9a is required.

Figure 6:
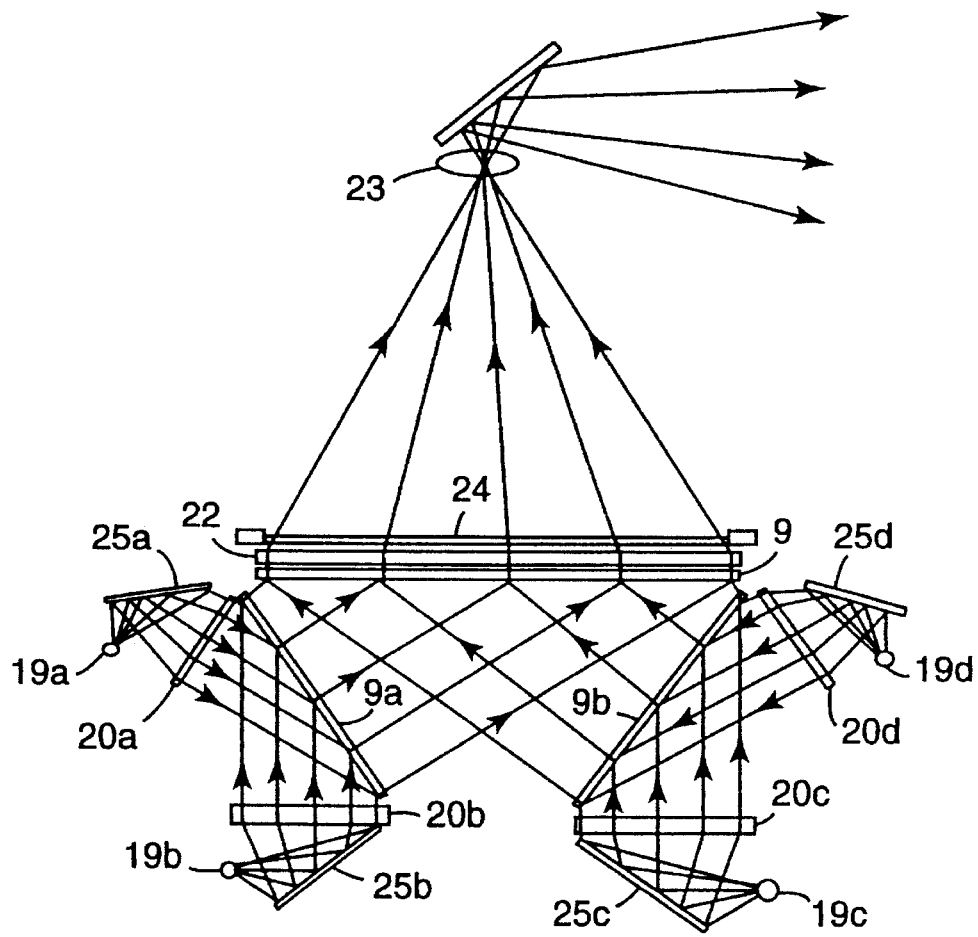
FIG. 6 is a schematic illustration of a projection system that combines and integrates the output of four lamps.

FIG. 6 shows a configuration that combines the output of four light sources 19a, 19b, 19c, and 19d. In this arrangement, the additional linear prismatic film element 9b, additional Fresnel lens collimators 20c and 20d, and additional folding mirrors 25c and 25d are shown. This cascading process can be further extended to integrate the output of additional light sources.

The beam shaping requirements to fill rectangular optical elements in this multiple lamp projection system are most easily achieved when these optical elements have an aspect ratio L/W that is close to unity, e.g. a square perimeter. To achieve this condition, it is preferable that the each additional optical element be oriented along the shorter side of the rectangular element preceding it. For the two lamp system shown in FIG. 4 and illustrated again in more detail in FIG. 7, with a rectangular linear prismatic element 9 having a length $L_1$=8 units, and a width $W_1$=6 units ($L_1/W_1$=1.33), if the Fresnel lens collimators 20a and 20b (only 20a is shown) are oriented along the $W_1$ dimension, then the length $L_2$ of the collimator is $L_2$=$W_1$=6 units, and the width $W_2$ of the collimator= $L_1/2$=4 units, giving an aspect ratio $L_2/W_2$=6/4= 1.5. If the Fresnel lens collimators were oriented along the $L_1$ dimension, then the collimator aspect ratio= $L_2/W_2$=8/3=2.67, and beam shaping is more difficult to achieve.

Similarly, for the four lamp system shown in FIG. 6, with a square prismatic element 9 having a length $L_1$=12 units, and a width $W_1=12$ units, then the linear prismatic element 9a must have an aspect ratio $L_2/W_2=12/6=2$. If the Fresnel lens collimators 20a and 20b are oriented along the $W_2$ dimension, then the aspect ratio of the collimators=$L_3/W_3=$ 6/6=1, which is the ideal beam shaping requirement.

It is also important to note that for each additional level of multiple light sources, e.g. two lamps, four lamps, eight lamps, etc., that the area of each additional linear prism element or Fresnel collimator, is halved. This limits the achievable light collection and sets a practical limit on the number of lamps that can be integrated.

Figure 9:
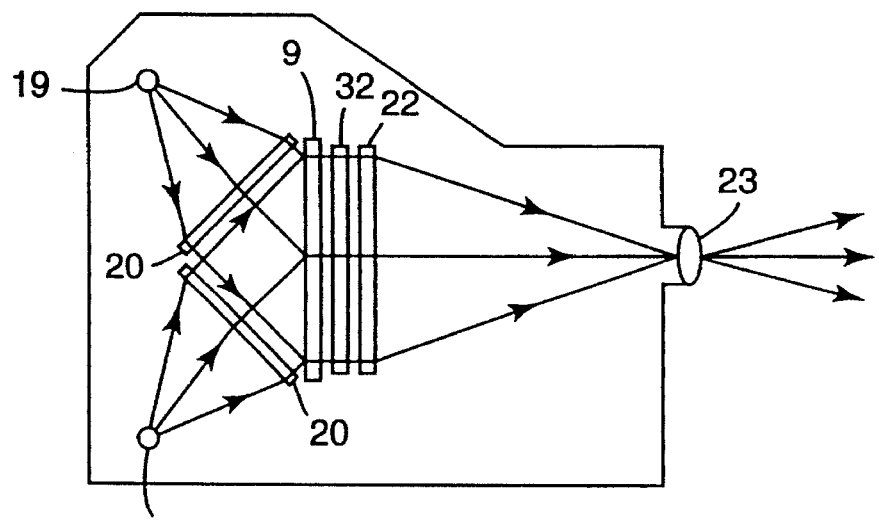
FIG. 9 is a schematic illustration of an integrated liquid crystal projection system that combines and integrates the output of two lamps.

FIG. 9 shows a projection system that efficiently integrates the output of two lamps, as is also illustrated in FIG. 4, again providing uniform screen brightness when each lamp is individually on, and doubling the screen brightness when both lamps are on. A polarization-modulating display 32, such as a liquid crystal display, is positioned between Fresnel lens 22 and the 60° linear prismatic film 9 to define an optical window through which light from the lamps is directed. This liquid crystal display panel 32 comprises a layer of liquid crystalline material which can be of a twisted nematic or a supertwisted nematic enclosed between two transparent substrates or plates. Each of these plates may comprise a transparent control electrode which can be divided into a large number of columns and rows; thus defining a large number of image elements in the display panel. These image elements are controlled by driving the electrodes, and the image display panel is referred to as passively controlled. Alternatively, one of the substrates can be provided with an electrode while the other is provided with semi-conductor drive electronics. A device employing this type of control is referred to as an actively controlled image display panel.

EXAMPLE

Figure 7:
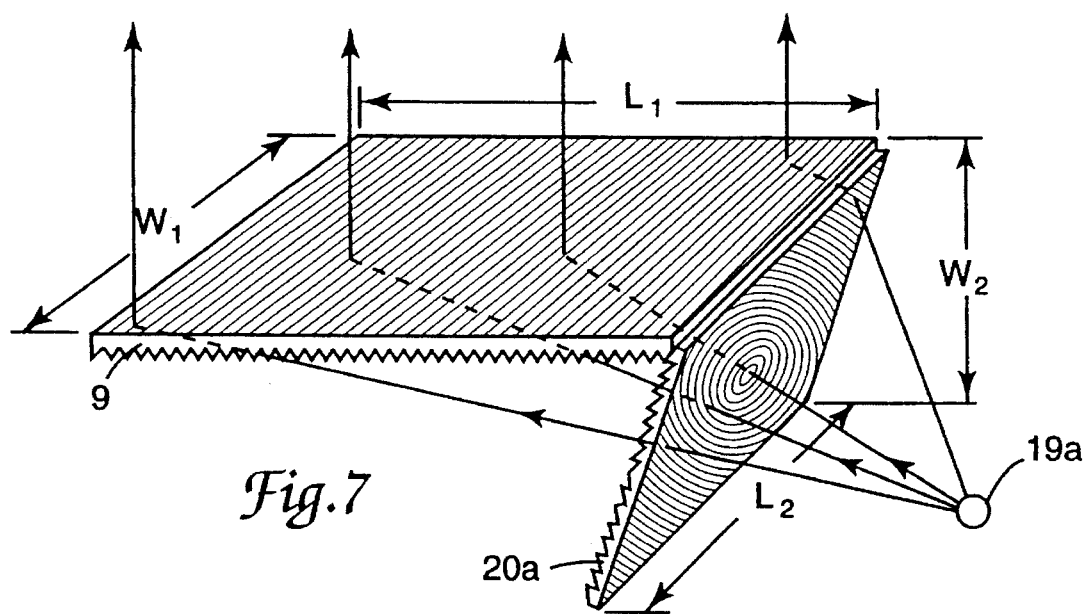
FIG. 7 is a perspective view showing desirable shapes of lenses for use in the present invention.
Figure 8:
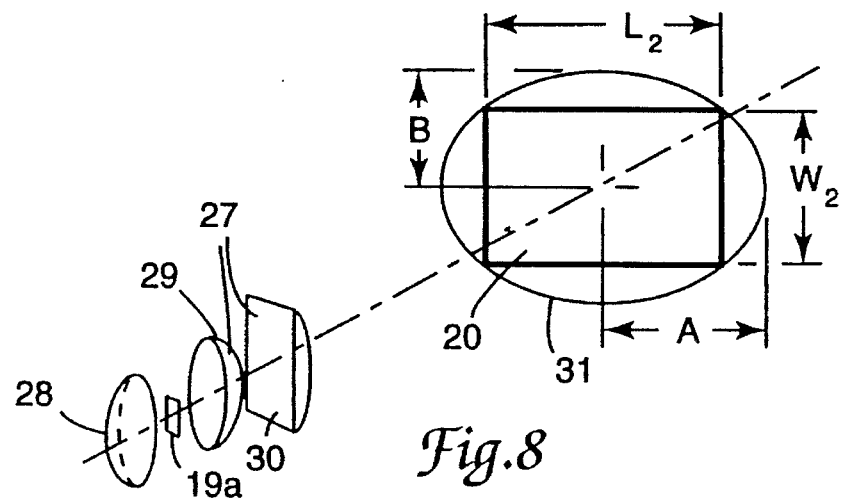
FIG. 8 is a perspective schematic illustration showing condensing optics used with the present invention to form an elliptical shaped beam at the rectangular Fresnel lens collimator.

Described below with respect to FIG. 7, and further illustrated in FIG. 8, is a specific arrangement that has been constructed for use as an LCD overhead projector. The rectangular stage aperture size has a length $L_1=228.6$ millimeters (9.0 inches) and a width $W_1$ of 171.5 millimeters (6.75 inches), giving an aspect ratio of $L_1/W_1=4/3$, a common ratio for many LCD projection panels. The light source filaments 26 (only one is shown) are positioned about 11 millimeters behind a pair of glass condensers 27 which collect and direct light to the Fresnel lens collimator a. The light sources 26 are 400 watt, 36 volt flat mandrel capsule types, ANSI Code designation EVD. A spherical reflector 28 having a diameter of 60 millimeters and a radius of curvature of 32.5 millimeters focuses the back rays in the forward direction. An aspheric symmetric Pyrex condenser 29, having an approximate focal length of 55 millimeters and a diameter of 60 millimeters, focuses the light from the lamps 26 into a light cone of circular cross-section. A square optical crown glass cylinder lens 30 having an approximate focal length of 175 millimeters, and dimensions of 82 by 82 millimeters, is placed in close proximity to the Pyrex condenser 29. This cylinder lens 30 further compresses this circular cone of light in one direction to form an elliptical shaped beam 31. The single element Fresnel lens collimators 20a have a focal length of 178 millimeters, operate between f/0.75 and f/1.0, and are oriented symmetrically at 30° from the vertical. The height $W_2$ of the Fresnel collimator 20a is half the length $L_1$ of the stage aperture, $W_2=114.3$ millimeters (4.5 inches), and the width $L_2$ of the Fresnel collimator 20a is the width of the stage aperture, $L_2=171.5$ millimeters (6.75 inches). The aspect ratio $L_2/W_2$ of the collimating Fresnel lens is 1.5. To efficiently fill the rectangular aperture of the collimating Fresnel lens, the following relationship should be approximated: $L_2/W_2=A/B$, where A and B are the major and minor axes of the elliptic cross-section 31 of the light beam at the plane of the Fresnel collimator as shown in FIG. 8.

As illustrated in FIG. 4, the 60° linear prismatic film 9 was fabricated in 2 millimeter thick acrylic plastic, with dimensions slightly larger than the stage aperture, and the width of each individual prismatic groove 10 was about 0.5 millimeters. A rectangular acrylic Fresnel lens 22, having a focal length of about 325 millimeters, groove widths between 0.5 and 0.125 millimeters, and approximately the same size as the linear prismatic film 9, was placed between the linear prismatic film 9 and a glass platen 21 defining the stage aperture. A triplet projection lens 23 of 330 millimeter focal length projected an image of the stage to fill a 60 inch wide screen at approximately 6.7X magnification.

With this configuration, an average screen illumination of 140 foot-candles was measured from each individual lamp, and an average screen illumination of 280 foot-candles with both lamps operating. This is equivalent to the brightness of a 7000 lumen square aperture overhead projector projecting a 60 inch square image.

It can be appreciated by those skilled in the art, that by the use of additional folding mirrors in the configurations described, modifications of the arrangement of optical components can be achieved. These modifications can reduce the base height of the projector by variation of width and length of the projector base containing these components. It will also be appreciated that although specific examples of the invention have been illustrated, the invention is more generally applicable to any device which requires collimated light in the optical path.

We claim:

1. A projection system for projecting an image onto a screen comprising:

an enclosure having an optical window;

a linear beam-combining film having a flat first surface defining a plane and a structured second surface opposite said first surface, said structured surface having a plurality of parallel linear, triangular prisms each having two sides having an included angle ranging from about 58° to about 62°; and at least one light source disposed at least one end of said film and emitting collimated light in a direction which is perpendicular to the first parallel sides of said linear prisms and inclined at an angle ranging from about 56.5° to about 63.5° with respect to a perpendicular to said plane of said film such that said light is directed to substantially totally illuminate one of said two sides of said linear prisms and is totally internally reflected within said film to exit said flat first surface and be directed toward the optical window as a collimated beam.

2. A projection system according to claim 1 wherein said angle of inclination of said collimated light from said light source is related to said included angle of said prism sides by the equation:

$$\theta = 90° - \left( \frac{\alpha}{2} + a\sin\left( n \cos\left( \frac{3}{2}\alpha \right) \right) \right)$$

wherein:

θ=said angle of inclination of said collimated light
α=said included angle of said prism sides n=index of refraction of the material of said film.

3. A projection system according to claim 1 further including at least a second light source emitting collimated light in a direction which is perpendicular to the second parallel sides of said linear prisms and inclined at an angle ranging from about 56.5° to about 63.5° with respect to a perpendicular to the plane of said film such that said light is directed to substantially totally illuminate the other of said two sided linear prisms and is totally internally reflected within said film to exit said flat first surface and be directed toward the optical window as a collimated beam.

4. A projection system according to claim 3 wherein said angle of inclination of said collimated light from each of said light source is related to said included angle of said prism sides by the equation:

$$\theta = 90° - \left( \frac{\alpha}{2} + a\sin\left( n \cos\left( \frac{3}{2} \alpha \right) \right) \right)$$

wherein:
  $\theta$=said angle of inclination of said collimated light
  $\alpha$=said included angle of said prism sides
  n=index of refraction of the material of said film.

5. A projection system according to claim 3 wherein said light emitting from each light source illuminates all portions of the screen.

6. A projection system according to claim 1 wherein said optical window is rectangular.

7. A projection system according to claim 6 wherein said light source comprises a rectangular-shaped collimator for collimating said light.

8. A projection system according to claim 7 wherein said rectangular-shaped collimator is a Fresnel lens.

9. A projection system according to claim 7 wherein said rectangular collimator has a length to width aspect ratio of not greater than 2.

* * * * *